April 18, 1961  E. A. ANDREW  2,979,769
LACQUER TREATMENT APPARATUS
Filed Feb. 10, 1959  4 Sheets-Sheet 1

INVENTOR.
EUGENE A. ANDREW
ATTORNEYS

April 18, 1961  E. A. ANDREW  2,979,769
LACQUER TREATMENT APPARATUS
Filed Feb. 10, 1959  4 Sheets-Sheet 4

WIRE CLEARANCE
vs.
ORIFICE DIAMETER

INVENTOR.
EUGENE A. ANDREW

United States Patent Office 2,979,769
Patented Apr. 18, 1961

2,979,769

LACQUER TREATMENT APPARATUS

Eugene A. Andrew, Berkeley, Mo., assignor to Olin Mathieson Chemical Corporation, East Alton, Ill., a corporation of Virginia Filed Feb. 10, 1959, Ser. No. 792,329

3 Claims. (Cl. 18—12)

This invention relates generally to the treatment of plastics and particularly to an apparatus for extruding a body of lacquer or the like and simultaneously cutting the extrusion into discrete particles.

In my Patent No. 2,775,788 granted January 1, 1957, there is described an apparatus for extruding lacquer or the like and concomitantly severing the extruded streams into discrete particles. As disclosed in this patent, the lacquer to be extruded is introduced under pressure into a chamber from which it escapes through a plurality of extrusion orifices in the sidewall of a cylindrical extrusion chamber. Immediately upon being extruded, the lacquer is severed into increments of predetermined lengths by a series of blades moving concurrently about the cylindrical wall in shearing relationship with the edges of the orifices therein. While such an arrangement is generally satisfactory, it does possess a number of inherent disadvantages. With the rotating cutter riding on the surface of the cylindrical extrusion head, each of the perforations within the cylinder is blocked as the blades pass over it. Thus, the flow of lacquer through the orifices is intermittent rather than constant. Also, the blades exert a physical shear effect on the forward end of each increment of lacquer as the lacquer is held in flow check until the blade passes across the orifice. The effect of such a physical shearing of the lacquer increments is evidenced by the formation of cylindrical pellets or slugs having one dimpled end. The formation of such a nonuniform product is undesirable and, in some applications, cannot be tolerated. The use of the apparatus in accordance with my patent was also limited due to the necessary thickness of the cutter blades riding on the surface of the cylindrical extrusion head. In addition, this apparatus was subject to wear since each cutting edge contacts the entire extrusion surface.

The object of the present invention is to provide a novel and improved apparatus for extruding and severing lacquer and the like. A further object of this invention is to provide an extrusion apparatus overcoming the difficulties of the prior art. A more specific object of this invention is to provide an apparatus for extruding and severing lacquer and the like in which the rate of production of severed bodies is higher, control over the size of the severed bodies is materially improved and the product is more uniform than with the apparatus disclosed in the aforesaid patent.

Generally stated, these and other objects are accomplished by extruding the lacquer or the like through a plurality of orifices or perforations in an extrusion member and severing the extruded lacquer into increments of predetermined lengths with a series of wires parallel to but spaced from the external face of the extrusion member. The extrusion member can be flat, cylindrical, or any convenient shape. When a flat extrusion member is utilized, it has been found more convenient to have the wires positioned so that they radiate from the center of the extrusion member to its periphery. In using a cylindrical extrusion member, the wires are preferably in the form of a concentric cylindrical cage about the perforated cylinder. Normally, all of the wires are maintained equidistant from the orifices or perforations. However, this invention also encompasses apparatus having a superimposed series of wires positioned at equal distances away from the perforations. In accordance with this modification, each increment of lacquer can be simultaneously cut into two or more portions of equal lengths.

The perforations or orifices in the extrusion head are substantially uniform in size and their diameters must be maintained between about 0.020 inch and about 0.150 inch. Likewise, the diameter of the wire must be maintained within about 0.005 inch and about 0.045 inch. In addition, the clearance between the orifices and the wire must be maintained between about 0.004 inch and about 0.075 inch. The relationship between the magnitude of these essential components will be explained more fully hereinafter.

The present invention will be more readily understood when the following description is read in connection with the accompanying drawing in which.

Figure 1:
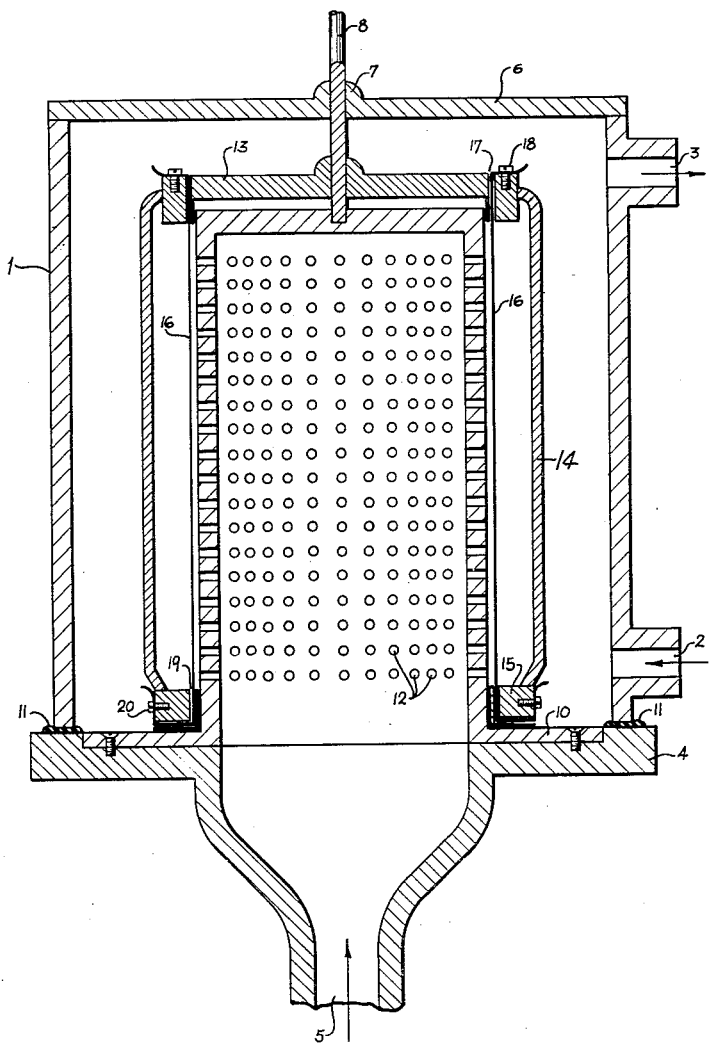
Figure 1 is a longitudinal sectional view of one embodiment of the present invention.

In the embodiment shown in Figure 1 of the drawing, the apparatus consists of a circular vessel 1 provided with an intake port 2 for suspending liquor and an outlet port 3 for discharging the suspension of lacquer particles in a suspending medium or liquor. The vessel 1 is mounted upon a base 4 provided with a central inlet 5 for receiving lacquer under pressure from an external source. The vessel 1 is also provided with a cap 6 having a center hub 7 which provides a bearing and seal for a shaft 8 driven by an external source of power not shown. A chamber element 9 having an exterior cylindrical surface and a mounting flange 10 is mounted upon the base 4 and the cylindrical wall of vessel 1 is sealed to flange 10 by means of a gasket or the like as shown in 11 so that a substantial annular space is provided between the exterior of chamber 9 and the interior of vessel 1. The lacquer is introduced under pressure through inlet 5 and filled to the interior of chamber 9. The cylindrical wall of chamber 9 is provided with a multiplicity of orifices or perforations 12. The pressure on the lacquer within the chamber forces the lacquer out through these orifices. The orifices 12 are of substantially uniform diameter, the size of which is dependent upon the size of the stream to be extruded.

On the end of shaft 8 within vessel 1, there is mounted a wire carrying hub 13 connected by means of spokes 14 to a ring 15 about the other end of the cylindrical chamber 9. A plurality of wires 16 extend substantially parallel to the axis of the cylindrical chamber 9 from hub 13 to ring 15. The wires pass through slot 17 in hub 13 and are maintained in position by fastening and tensioning screws 18. The opposite end of the wires pass through a corresponding slot 19 in the ring 15 and are maintained taut by set screws 20.

In operation, shaft 8 together with hub 13, ring 15 and wires 16 are rotated relative to the cylindrical chamber element 9. As the lacquer is forced through the perforations, it is severed into increments of a size dependent upon the number of wires and the speed of rotation of the shaft. The severed lacquer particles are suspended in the liquor introduced through intake port 2 and the suspension of the lacquer particles in the liquor is discharged through outlet port 3.

Figure 2:
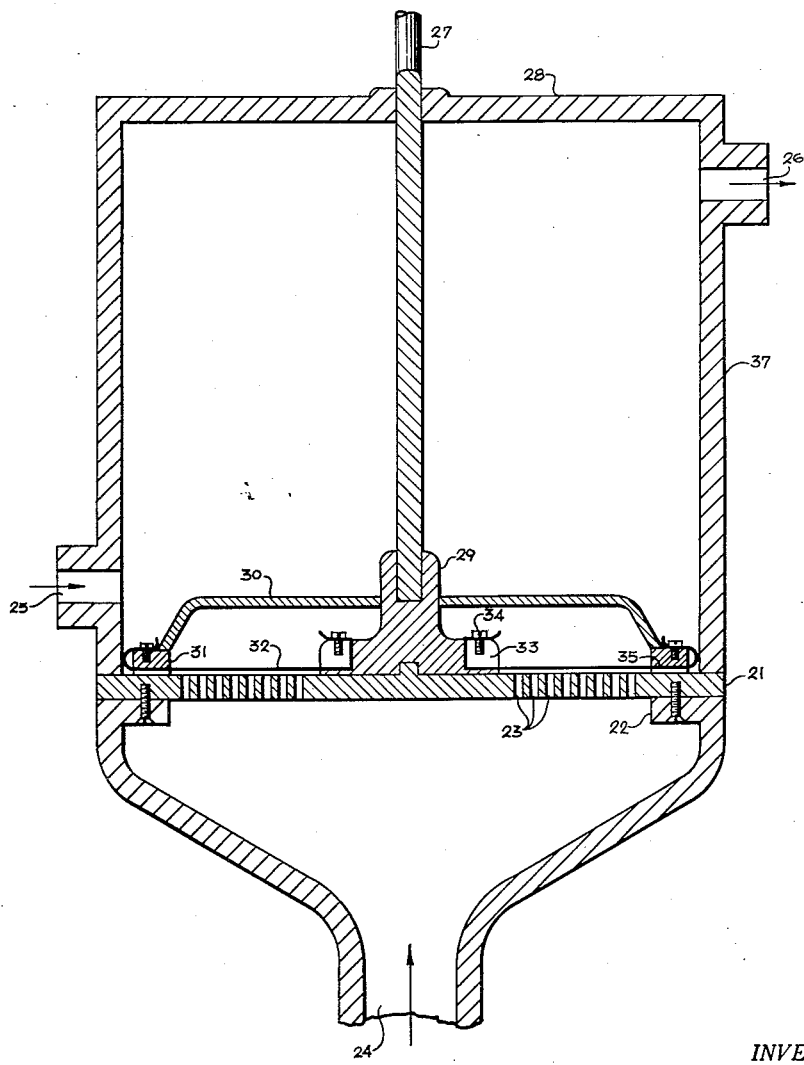
Figure 2 is a longitudinal sectional view of another embodiment.

In the embodiment illustrated in Figure 2 of the drawing, the lacquer is extruded through a flat circular plate rather than through orifices in a cylindrical wall. A circular plate 21 is secured to mounting flange 22 and provided with a plurality of orifices 23. The lacquer under pressure is introduced through inlet 24 and is forced out through orifices 23. A cylindrical vessel 37 provided with liquor inlet port 25 and liquor outlet port 26 encloses the upper surface of the circular plate 21. A shaft 27 passes through the top 28 of the cylindrical vessel and is provided with suitable sealing and bushing means. The shaft is rotated by a source of power not shown. The rotating shaft terminates in hub 29 provided with a plurality of spokes 30 which extend from the hub to annular ring 31 riding near the periphery of circular plate 21. Wires 32 extend radially from hub 29 to ring 31. The wires are positioned by grooves 33 and set screw 34 in the hub and by grooves 35 and set screws 36 in the ring in the same manner as described with regard to the embodiment of Figure 1. Here again, the wire is in functional relationship with the orifices and spaced therefrom. In this embodiment, as the lacquer is introduced under pressure through inlet 24 and the liquor is introduced through inlet port 25, shaft 27 together with hub 29, ring 31 and wires 32 rotate to sever the extruded lacquer into uniformly sized segments. The suspension of lacquer particles in the liquor is then discharged through outlet port 26.

Figure 3:
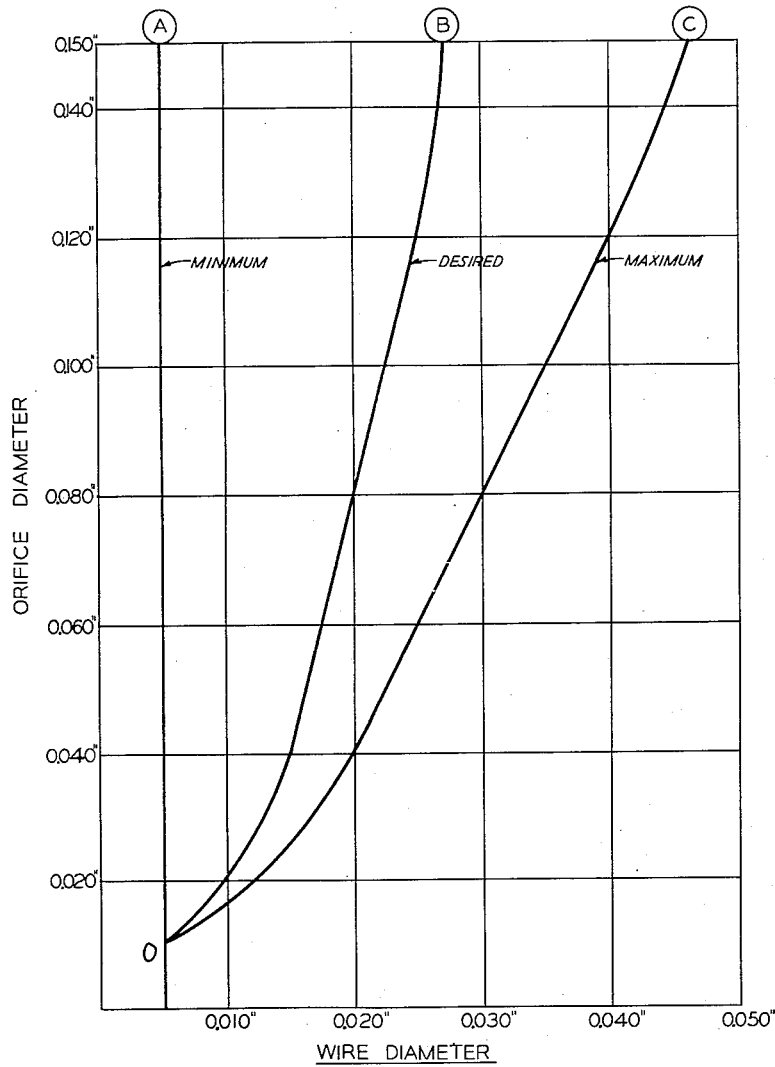
Figure 3 is a graph depicting the relationship between the diameter of the orifices and of the wire.
Figure 4:
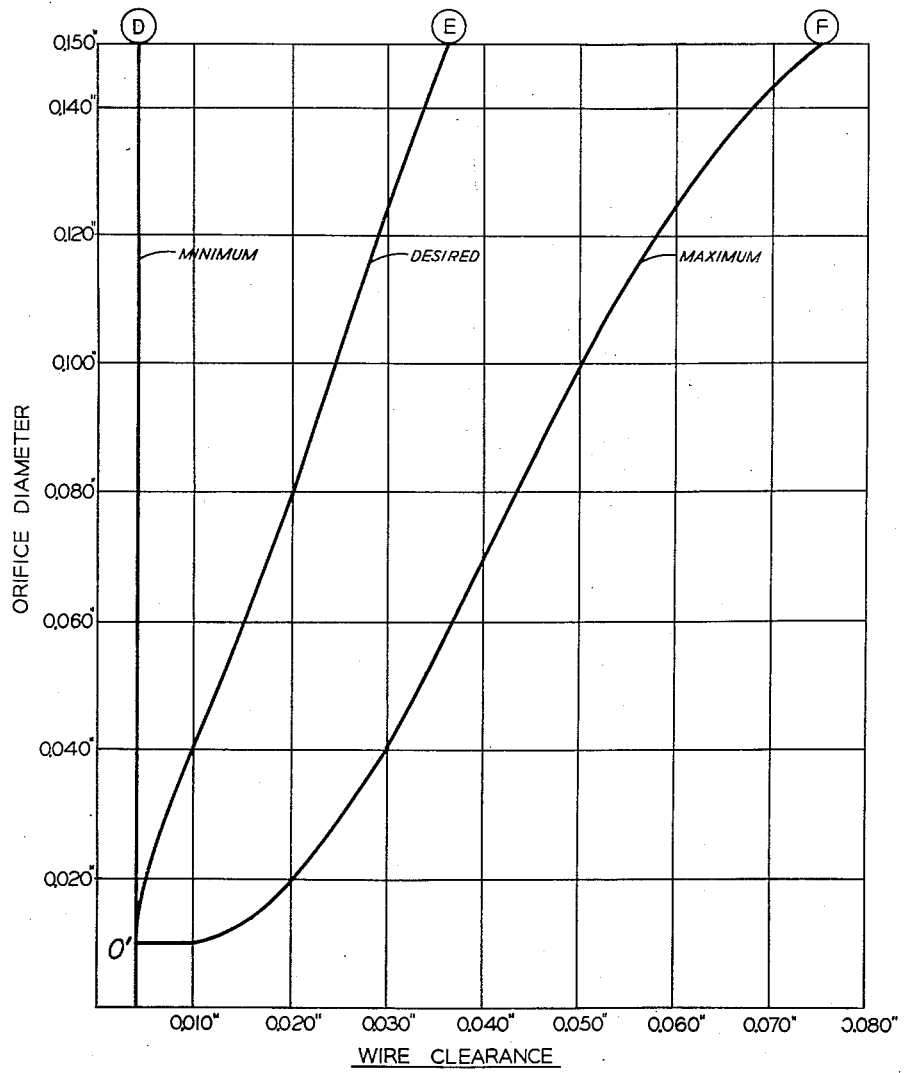
Figure 4 is a graph depicting the relationship between the diameter of the orifices and the clearance between the orifice head and the wire.

As indicated hereinabove, the magnitude of the diameter of the orifices, the diameter of the wire, and the clearance between the wire and the orifices must be maintained within specified limits. These relationships will be more fully explained in connection with Figures 3 and 4 of the drawing. It has been found that the apparatus of this invention will perform reliably and satisfactorily when the diameter of the orifices is maintained between about 0.010 inch and about 0.150 inch. When the diameter of the orifices are below 0.010 inch, an exorbitant amount of pressure is required to force the lacquer through the orifices. On the other hand, when the diameter of the orifices exceeds substantially about 0.150 inch, uniformity of product diminishes appreciably and operation of the apparatus is exceedingly difficult to control. Also, the diameter of the wire as well as the space or clearance between the wire and the orifices are dependent upon the diameter of the orifices. In general, the diameter of the wire and the clearance between the wire and the orifices increases as the orifice diameter increases. However, this is not a straight line function but has been defined within very definite limits. These are best illustrated in Figures 3 and 4 of the drawing. In Figure 3, the line AO representing a wire diameter of approximately 0.005 inch, the smallest diameter wire that can be practicably used regardless of the diameter of the orifices. Attempts to use smaller wires have been attended by breaking and stretching due to lack of tensile strength and frequent shut-down for replacement. The diameter of the wire can increase gradually as the orifice diameter increases to a value of approximately 0.046 inch. Thus, the area of Figure 3 bounded by the lines OA, OC and AC depicts the operable relationship between the size of the orifices and the diameter of the wire. When the diameter of the wire for any given orifice is represented by a point to the right of line OC, it has been found that the wire had a deforming effect upon the lacquer particles being formed and is too large to provide an operable cutting edge. Optimum results are obtained when orifices of a given size are paired with wires of such a size that their relationship follows along the line OB.

The relationship of the orifice diameter and the distance between the wire and the orifices is graphically portrayed in Figure 4. Line O'D represents a minimum clearance of 0.004 inch. When the clearance is below this value, the wires have a tendency to wear abnormally fast with resultant breakage. On the other hand, if the wire is too remote from the external surface of the orifices, the extruded lacquer strands will have an opportunity to bend or deform the lacquer streams before they are cut and give unevenly sized particles. Here again, the wire clearance increases generally with the diameter of the orifices. The maximum permissible wire clearance is shown by line O'F. Optimum results are obtained when the relationship between the size of the orifices and the wire clearance can be expressed by line O'E. While it is preferred to utilize circular extrusion orifices, it will be readily understood that differently shaped orifices can be used provided only that the characteristic flow thereof is equivalent to that of the circular perforations described above.

The term "wire" as used herein designates metal or its equivalent in the form of a thread or slender rod. While it is normally preferred to use stainless steel, any type of metal compatible with the materials being handled and possessed of requisite tensile strength, such as piano wire, tungsten, titanium, chromium, nickel, and the like, can also be used. In addition, various natural and synthetic fibers may be utilized provided only that they have the requisite tensile strength and are not adversely affected by the materials being processed.

While two complete embodiments of the invention have been disclosed in detail, it is to be understood that various modifications can be made to adapt the apparatus to particular applications. It is therefore to be distinctly understood that the invention is not limited by the foregoing disclosures except as indicated in the appended claims.

What is claimed is:

1. An apparatus for simultaneously extruding and slicing lacquer and the like and suspending the same in liquor comprising an enclosing vessel having a liquor intake port and a liquor outlet port, a cylindrical extrusion chamber mounted within said vessel, said chamber having a circular closed end, an inlet, and a perforated cylindrical wall, the perforations within the cylindrical wall being substantially uniform and having a diameter between about 0.020 inch and about 0.015 inch, means for forcing lacquer into the chamber through said inlet end and out through said perforated cylindrical wall into the space between said cylinder and said vessel, a plurality of taut wires in spaced relationship external to the cylindrical wall, the diameter of each of the wires being substantially equal and between about 0.005 inch and about 0.045 inch, means for maintaining the wires a fixed distance of between about 0.004 inch and about 0.075 inch from the cylindrical wall and means for driving said wires in relative rotation about the axis of the said cylindrical wall.

2. An apparatus for simultaneously extruding and slicing lacquer and the like and suspending the same in liquor comprising an enclosing vessel having a liquor intake port and a liquor outlet port, a cylindrical extrusion chamber mounted within said vessel, said chamber having a circular closed end, an inlet end, and a perforated cylindrical wall, means for forcing lacquer into the chamber through said inlet end and out through said perforated cylindrical wall into the space between said cylinder and said vessel, a plurality of taut wires in spaced relationship external to the cylindrical wall, means for maintaining the wires a fixed distance from the cylindrical wall and means for driving said wires in relative rotation about the axis of said cylindrical wall, the relationship between the diameter of the perforations in the cylindrical wall and the diameter of the wire being maintained at such a value that it is within the area defined by lines AO, CO and ABC of Figure 3, and the relationship between the size of the perforations and the distance of the wire from the cylindrical wall being maintained at such a value that it is within the area defined by lines DO' and FO' of Figure 4.

3. An apparatus for simultaneously extruding and slicing lacquer and the like and suspending the same in liquor comprising an enclosing vessel having a liquor intake port and a liquor outlet port, a cylindrical extrusion chamber mounted within said vessel, said chamber having a circular closed end, an inlet end, and a perforated cylindrical wall, means for forcing lacquer into the chamber through said inlet end and out through said perforated cylindrical wall into the space between said cylinder and said vessel, a plurality of taut wires in spaced relationship external to the cylindrical wall, means for maintaining the wires a fixed distance from the cylindrical wall and means for driving said wires in relative rotation about the axis of said cylindrical wall, the relationship between the size of the orifice and the diameter of the wires being defined by the line BO of Figure 3 and the relationship between the size of the orifices and the distance between the cylindrical wall and wires being defined by the line EO'.

References Cited in the file of this patent

UNITED STATES PATENTS

| | | |
|---|---|---|
| 663,140 | Walker et al. | Dec. 4, 1900 |
| 2,037,856 | Filippi | Apr. 21, 1936 |
| 2,653,350 | Piperoux | Sept. 29, 1953 |
| 2,775,788 | Andrew | Jan. 1, 1957 |
| 2,783,498 | Richardson | Mar. 5, 1957 |